United States Patent
Huang et al.

(10) Patent No.: US 11,397,756 B2
(45) Date of Patent: Jul. 26, 2022

(54) DATA ARCHIVING METHOD AND COMPUTING DEVICE IMPLEMENTING SAME

(71) Applicant: HON HAI PRECISION INDUSTRY CO., LTD., New Taipei (TW)

(72) Inventors: An-Chi Huang, New Taipei (TW); Ching-Hsuan Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 147 days.

(21) Appl. No.: 16/862,201

(22) Filed: Apr. 29, 2020

(65) Prior Publication Data

US 2021/0133212 A1 May 6, 2021

(30) Foreign Application Priority Data

Nov. 4, 2019 (CN) .......................... 201911066748.0

(51) Int. Cl.
| | |
|---|---|
| *G06F 16/28* | (2019.01) |
| *G06F 16/21* | (2019.01) |
| *G06N 3/08* | (2006.01) |
| *G06F 16/23* | (2019.01) |
| *G06N 3/04* | (2006.01) |
| *G06F 16/25* | (2019.01) |

(52) U.S. Cl.
CPC .......... *G06F 16/285* (2019.01); *G06F 16/219* (2019.01); *G06F 16/2379* (2019.01); *G06F 16/258* (2019.01); *G06N 3/04* (2013.01); *G06N 3/08* (2013.01)

(58) Field of Classification Search
CPC .. G06F 16/285; G06F 16/2379; G06F 16/219; G06F 16/258; G06F 40/20; G06F 16/113; G06N 3/04; G06N 3/08; G06N 5/025; G06N 5/046
USPC .................................................. 707/694
See application file for complete search history.

(56) References Cited

U.S. PATENT DOCUMENTS

| | | | |
|---|---|---|---|
| 2011/0258195 A1* | 10/2011 | Welling | G06K 9/72 707/740 |
| 2014/0156567 A1* | 6/2014 | Scholtes | G06F 16/00 706/12 |

* cited by examiner

*Primary Examiner* — Evan Aspinwall
(74) *Attorney, Agent, or Firm* — ScienBiziP, P.C.

(57) ABSTRACT

A data archiving method includes obtaining a data format of data to be processed, searching for a data category corresponding to the data format in a first database, extracting feature information of the data to be processed according to a first preset rule if the data category corresponding to the data format is found and storing the feature information in the first database according to a storage rule, and searching the data category corresponding to the data format in a second database according to a second preset rule if no data category corresponding to the data format is found, extracting feature information of the data to be processed, and storing the extracted feature information in the first database according to the storage rule. The first database stores data categories of different data formats of processed data. The second database stores feature information of multiple data categories.

12 Claims, 3 Drawing Sheets

DATA ARCHIVING METHOD AND COMPUTING DEVICE IMPLEMENTING SAME

FIELD

The subject matter herein generally relates to data archiving, and more particularly to a data archiving method and a computing device implementing the data archiving method.

BACKGROUND

Generally, various industries need to classify and sort collected data. However, types of data that need to be sorted in different industries are diverse, and data archiving errors may occur due to logical errors and carelessness of staff, which makes manual data archiving inefficient.

BRIEF DESCRIPTION OF THE DRAWINGS

Implementations of the present disclosure will now be described, by way of embodiments, with reference to the attached figures.

DETAILED DESCRIPTION

Figure 1:
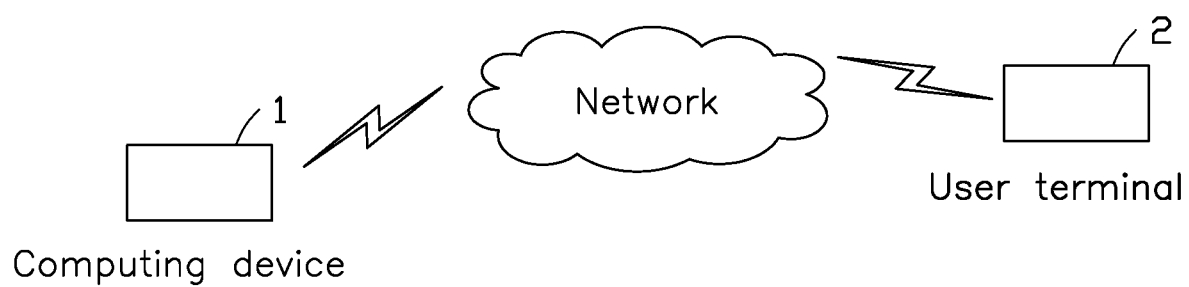
FIG. 1 is a schematic diagram of an application environment of a data archiving method.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows a schematic diagram of an application environment of a data archiving method.

The data archiving method is applied to a computing device 1 which establishes a communication connection with at least one user terminal 2 through a network. The network may be a wired network or a wireless network, such as radio, wireless fidelity (WIFI), cellular, satellite, and broadcast.

The computing device 1 may be an electronic device, such as a personal computer, a tablet computer, a server, etc., where the server may be a single server, a server cluster, or a cloud server. The computing device 1 is installed with data archiving software, and configured to archive and store data sent by the at least one user terminal 2.

The user terminal 2 is an electronic device, such as a smart phone, a tablet computer, a laptop computer, a desktop computer, and the like, with a data recording function.

In another embodiment, the data archiving method is applied to the computing device 1, which has both the data recording function and the data archiving storage function. The computing device 1 archives the recorded data to be processed using the data archiving method and stores the data in the computing device 1. The computing device 1 may be a smart phone, a tablet computer, a laptop computer, a desktop computer, a server, or the like.

Figure 2:
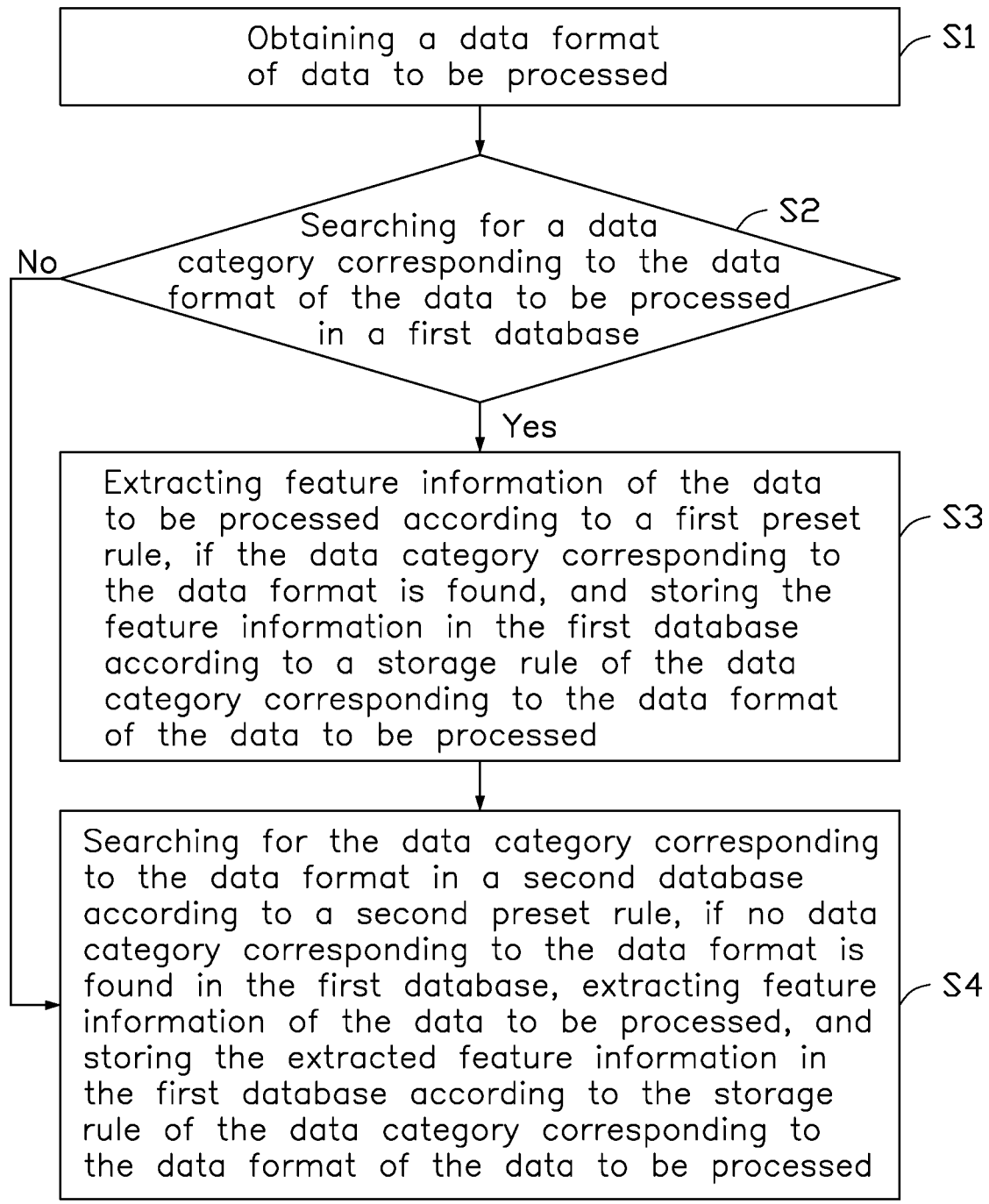
FIG. 2 is a flowchart of the data archiving method.

FIG. 2 shows a flowchart of the data archiving method. According to different requirements, the order of blocks in the flowchart can be changed, and some blocks can be omitted or combined.

Block S1: a data format of data to be processed is obtained.

In one embodiment, the computing device 1 acquires data to be processed sent by the at least one user terminal 2. The data to be processed includes one or more of words, numbers, and images. The data format of the data to be processed may be EXCEL, WORD, PDF, TXT, and other types.

In another embodiment, block S1 further includes preprocessing the obtained data to be processed. For example, the preprocessing may include removing extra spaces, punctuation, and character information in the data to be processed.

Block S2: a data category corresponding to the data format of the data to be processed is searched in a first database. The first database is configured to store data categories of different data formats of processed data.

For example, data in the first database is categorized according to different data formats, and each data format is divided into multiple data categories according to different contents of the data. For example, an EXCEL data format is divided into multiple data categories according to the contents of the data, and the data categories include process parameters, equipment parameters, environmental parameters, and the like. The computing device 1 obtains the data to be processed sent by the at least one user terminal 2 and searches the first database for the data category corresponding to the data format of the data to be processed.

Block S3: if the data category corresponding to the data format is found, feature information of the data to be processed is extracted according to a first preset rule, and the feature information is stored in the first database according to a storage rule of the data category corresponding to the data format of the data to be processed.

In one embodiment, a method of extracting the feature information of the data to be processed according to the first preset rule and storing the feature information in the first database according to the storage rule of the data category corresponding to the data format of the data to be processed may include:

Obtaining feature information and a storage rule of the data category in the first database;

Extracting feature information to be processed that matches the feature information of the data category from the data to be processed; and Processing the feature information to be processed that matches the feature information of the data category according to the storage rule, and storing the processed feature information in the first database according to the data category corresponding to the data format of the processed data.

If the data to be processed is text data, the text data may be words or numbers. For example, the text data to be processed is a device maintenance record, and the contents in the device maintenance record include words and numbers, where the words may be a name of a component to be repaired or a name of a maintenance operator, and the numbers may be a maintenance time.

If the text data is words, a method of extracting the feature information to be processed that matches the feature information of the data category from the data to be processed may include the following:

Performing a matching calculation on the text data to be processed and the feature information of the data category, where the matching calculation includes logical merging and/or AI natural language processing;

Extracting feature information of the text data according to a result of the matching calculation; and Adjusting a word order of the extracted feature information according to at least one of semantics and part of speech of the words to be processed.

For example, the text data to be processed is a device maintenance record. The storage rule and the feature information of the data category corresponding to the device maintenance record are obtained in the first database. The feature information includes a name of a maintenance operator, a name of a maintenance device, a location of maintenance, and maintenance materials, and the storage rule is to store the feature information in a table form. The logical merging and AI natural language processing are used to extract the feature information from the text data to be processed. For example, according to a name format of the maintenance operator, name information is identified in the text data to be processed according to the AI natural language processing. If the text data to be processed belongs to a special technical field, a word vector algorithm is used to process keywords of the text data to be processed to obtain the feature information of the text data to be processed. The special technical field includes new technical fields or application fields that are limited to certain special industries such as military, medical technology, etc. Further, when the feature information of the identified text data has common characteristics, the common characteristics are visually marked according to a preset manner. The preset manner may include colors, symbols, special fonts, and the like. For example, when identifying the same name of the maintenance operator in multiple pieces of text data to be processed, the name of the maintenance operator is marked with different colors.

In another embodiment, the text data is simplified, and unnecessary modifiers are removed. For example, "for example, see the attachment", etc. is removed, and the part of speech of the words is determined, so that the meaning of the same word used as a noun and a verb can be determined.

If the text data is numbers, a method of extracting the feature information to be processed that matches the feature information of the data category from the data to be processed may include the following:

Obtaining digital feature information and a storage rule of the data category in the first database; and Using crawler technology to search for digital feature information that corresponds to the digital feature information in the data category.

For example, a crawler is used to search for digital feature information in the data to be processed that resembles the digital feature information in the data category. For example, the digital feature information in the data to be processed that resembles the recorded maintenance time in the first database is searched, and then the digital feature information in the data to be processed is stored in the corresponding data category in a digital storage manner.

In another embodiment, if the data to be processed is an image, contents of the image are identified, and the corresponding data category is searched in the first database. Then, the image to be processed is stored in the first database according to the corresponding data category and the storage rule.

Block S4: if no data category corresponding to the data format is found in the first database, the data category corresponding to the data format is searched in a second database according to a second preset rule, feature information of the data to be processed is extracted, and the extracted feature information is stored in the first database according to the storage rule of the data category corresponding to the data format of the data to be processed. The second database stores feature information of a plurality of data categories.

A method of searching for the data category corresponding to the data format in the second database according to the second preset rule may include:

Determining whether the data to be processed corresponds to a data category stored in the second database;

If the data to be processed corresponds to a data category stored in the second database, inputting keywords in the data to be processed into a preset neural network algorithm model to confirm the data category corresponding to the keywords of the data to be processed;

If the data to be processed does not correspond to a data category stored in the second database, adding a data category corresponding to the data to be processed to the second database.

For example, the data to be processed is related to statistics of incidence of diseases, including disease names, patient ages, patient genders, patient occupations, patient cities of residency, and patient living habits. The data category corresponding to the data to be processed is the medical field. If the data to be processed does not correspond to a data category stored in the second database, a new data category "medical field" is saved in the second database according to the storage rule. If the feature information in the medical field is found in the second database, the data to be processed and the feature information of the technical field in the second database are matched through the preset neural network algorithm model to find the technical field corresponding to the data to be processed. Then, the feature information of the keywords of the data to be processed are extracted as described in block S3, and the feature information is stored in the first database according to the data category corresponding to the data format of the data to be processed.

A method of constructing the second database may include:

Extracting keywords of a technical field corresponding to data from any data category;

Inputting the keywords into a second data model to extract feature information of the technical field; and Storing the extracted feature information and the corresponding data category in the second database.

A method of constructing the second data model may include:

Dividing the extracted keywords of the technical field corresponding to the data from different categories into a training set and a verification set;

Selecting a second data model and training the second data model by the training set, where the second data model obtains feature information of the keywords in the training set;

Verifying the trained second data model by the verification set, and obtaining an accuracy rate of the trained second data model according to a verification result;

Determining whether the accuracy rate of the trained second data model is greater than a preset threshold;

If the accuracy rate is greater than the preset threshold, outputting the trained second data model;

If the accuracy rate is not greater than the preset threshold, retraining the trained second data model.

The second database stores feature information of all technical fields in the prior art. The method of constructing the second database includes extracting keyword information from prior art materials, using a first data model to extract feature information of the keywords, and storing the extracted feature information in correspondence with the technical field. Technical information includes papers, journals, books, patents, web pages, etc.

Figure 3:
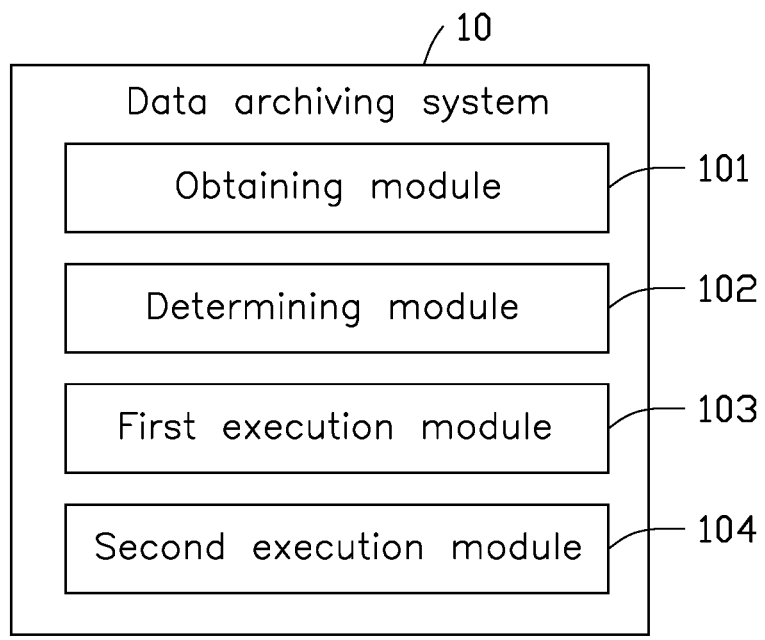
FIG. 3 is a block diagram of an embodiment of function modules of a data archiving system.

FIG. 3 is a block diagram of function modules of a data archiving system 10. The data archiving system 10 runs in a computing device. The computing device is connected to a plurality of user terminals through a network. The data archiving system 10 may include a plurality of function modules composed of program code segments. The program code segments are composed of instructions stored in a memory of the computing device and executed by at least one processor to execute data archiving functions.

The data archiving system 10 may be divided into a plurality of function modules according to functions performed by the data archiving system 10. Referring to FIG. 3, the function modules may include an obtaining module 101, a determining module 102, a first execution module 103, and a second execution module 104.

The obtaining module 101 is configured to obtain a data format of data to be processed. The obtaining module 101 may implement the method as described in block S1, and details will not be described again.

The determining module 102 is configured to search for a data category corresponding to the data format of the data to be processed in a first database. The determining module 102 may implement the method as described in block S2, and details will not be described again.

The first execution module 103 is configured to extract feature information of the data to be processed according to a first preset rule, if the data category corresponding to the data format is found, and store the feature information in the first database according to a storage rule of the data category corresponding to the data format of the data to be processed. The first execution module 103 may implement the method as described in block S3, and details will not be described again.

The second execution module 104 is configured to search the data category corresponding to the data format in a second database according to a second preset rule, if no data category corresponding to the data format is found in the first database, extract feature information of the data to be processed, and store the extracted feature information in the first database according to the storage rule of the data category corresponding to the data format of the data to be processed. The second execution module 104 may implement the method as described in block S4, and details will not be described again.

Figure 4:
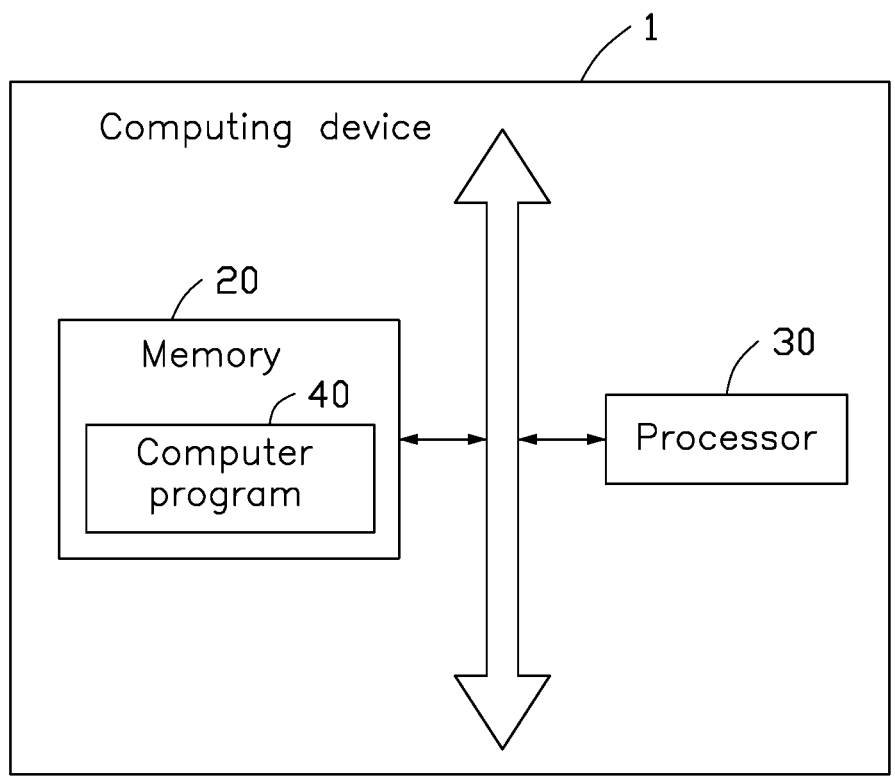
FIG. 4 is a block diagram of an embodiment of a computing device.

FIG. 4 is a block diagram of the computing device 1. The computing device 1 includes a memory 20, a processor 30, and a computer program 40, such as a data archiving program, stored in the memory 20 and executable by the processor 30. When the processor 30 executes the computer program 40, blocks S1-S4 in the data archiving method may be implemented. Alternatively, when the processor 30 executes the computer program 40, the functions of the modules in the data archiving system 10 may be implemented.

The computing device 1 may be a desktop computer, a notebook, a palmtop computer, or a cloud server. Those skilled in the art can understand that the schematic diagram is only an example of the computing device 1, and does not constitute a limitation on the computing device 1. It may include more or fewer components than shown in the figure, or combine some components, or have different components. For example, the computing device 1 may further include an input-output device, a network access device, a bus, and the like.

The processor 30 may be a central processing unit (CPU), or other general-purpose processors, digital signal processors (DSPs), application specific integrated circuits (ASICs), Field-Programmable Gate Arrays (FPGA), or other programmable logic devices, discrete gate or transistor logic devices, discrete hardware components, etc. The general-purpose processor may be a microprocessor, or the processor 30 may be any conventional processor, etc. The processor 30 is a control center of the computing device 1 and connects the entire computing device 1 by using various interfaces and lines.

The memory 20 may be configured to store the computer program 40 and/or modules, and the processor 30 may execute the computer program and/or modules stored in the memory 20 to realize various functions of the computing device 1. The memory 20 may mainly include a storage program area and a storage data area, wherein the storage program area may store an operating system, application programs required for at least one function (such as a sound playback function, an image playback function, etc.), data (such as audio data, phonebook, etc.) created according to the use of the computing device 1. In addition, the memory 20 may include a high-speed random access memory, and may also include a non-volatile memory, such as a hard disk, an internal memory, a plug-in hard disk, a smart media card (SMC), a secure digital (SD) Card, flash card, at least one disk storage device, flash memory device, or other volatile solid-state storage device.

When the modules integrated in the computing device 1 are implemented in the form of software functional units and sold or used as independent products, they can be stored in a computer-readable storage medium. Based on such an understanding, the present disclosure implements all or part of the processes in the method of the foregoing embodiment, and may also be completed by a computer program instructing related hardware. The computer program may be stored in a computer-readable storage medium. When the computer program is executed by a processor, the steps of the foregoing method embodiments can be implemented. The computer program includes computer program code, and the computer program code may be in a source code form, an object code form, an executable file, or some intermediate form. The computer-readable medium may include: any entity or device capable of carrying the computer program code, a recording medium, a U disk, a mobile hard disk, a magnetic disk, an optical disk, a computer memory, a read-only memory (ROM), Random Access Memory (RAM), electric carrier signals, telecommunication signals, and software distribution media. It should be noted that the content contained in the computer-readable medium can be appropriately increased or decreased according to the requirements of legislation and patent practice in the jurisdictions. For example, in some jurisdictions, the computer-readable medium excludes electric carrier signals and telecommunication signals.

In the several embodiments provided by the present disclosure, it should be understood that the disclosed computer device and method can be implemented in other ways. For example, the embodiments of the computer device described above are merely schematic. For example, the division of the units is only a logical function division, and there may be another division manner in actual implementation.

In addition, each functional unit in each embodiment of the present disclosure may be integrated in the same processing unit, or each unit may exist separately physically, or two or more units may be integrated in the same unit. The integrated unit can be implemented in the form of hardware, or in the form of hardware plus software function modules.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A data archiving method comprising:
    obtaining a data format of data to be processed and preprocessing the data to be processed, wherein preprocessing the data to be processed comprises removing extra spaces, punctuation, and character information in the data to be processed;
    searching for a data category corresponding to the data format of the data to be processed in a first database, wherein the first database is configured to store data categories of different data formats of processed data;
    if the data category corresponding to the data format is found, extracting feature information of the data to be processed according to a first preset rule, and storing the feature information in the first database according to a storage rule of the data category corresponding to the data format of the data to be processed, wherein the data to be processed is text data, the data to be processed is related to statistics of incidence of diseases, comprising disease names, patient ages, patient genders, patient occupations, patient cities of residency, and patient living habits, the text data is simplified, and certain modifiers in the text data are removed, a word vector algorithm is used to process keywords of the text data to obtain feature information of the text data, and when the feature information of the text data has common characteristics, the common characteristics are visually marked according to a preset manner; and
    if no data category corresponding to the data format is found, searching the data category corresponding to the data format in a second database according to a second preset rule, extracting feature information of the data to be processed according to the first preset rule, and storing the extracted feature information in the first database according to the storage rule of the data category corresponding to the data format of the data to be processed, wherein the second database stores feature information of a plurality of data categories.

2. The data archiving method of claim 1, wherein a method of extracting the feature information of the data to be processed according to the first preset rule and storing the feature information in the first database according to the storage rule of the data category corresponding to the data format of the data to be processed comprises:
    obtaining feature information and a storage rule of the data category in the first database;
    extracting feature information to be processed that matches the feature information of the data of the data category from the data to be processed; and
    processing the feature information to be processed that matches the feature information of the data of the data category according to the storage rule, and storing the processed feature information in the first database according to the data category corresponding to the data format of the processed data.

3. The data archiving method of claim 2, wherein when the text data is words, a method of extracting the feature information to be processed that matches the feature information of the data category from the data to be processed comprises:
    performing a matching calculation on the words and the feature information of the data of the data category, wherein the matching calculation comprises logical merging and/or AI natural language processing;
    extracting feature information of the words according to a result of the matching calculation; and
    adjusting a word order of the extracted feature information according to semantics and/or part of speech of the words to be processed.

4. The data archiving method of claim 1, wherein a method of searching for the data category corresponding to the data format of the data to be processed in the second database according to the second preset rule comprises:
    determining whether the data to be processed corresponds to a data category stored in the second database;
    if the data to be processed corresponds to a data category stored in the second database, inputting keywords of the data to be processed into a preset neural network algorithm model to confirm the data category corresponding to the keywords of the data to be processed; and
    if the data to be processed does not correspond to a data category stored in the second database, adding a data category corresponding to the data to be processed to the second database.

5. The data archiving method of claim 1, wherein a method of constructing the second database comprises:

extracting keywords of a technical field from technical data of any data category;
inputting the keywords into a second data model to extract feature information of the technical field; and
storing the extracted feature information and the corresponding data category in the second database.

6. The data archiving method of claim 5, wherein a method of constructing the second data model comprises:
dividing the extracted keywords of the technical field from the technical data of different categories into a training set and a verification set;
training the second data model by the training set, wherein the second data model obtains feature information of the keywords in the training set;
verifying the trained second data model by the verification set, and obtaining an accuracy rate of the trained second data model according to a verification result;
determining whether the accuracy rate of the trained second data model is greater than a preset threshold;
if the accuracy rate is greater than the preset threshold, outputting the trained second data model; and
if the accuracy rate is not greater than the preset threshold, retraining the trained second data model.

7. A computing device comprising:
a processor; and
a memory storing a plurality of instructions, which when executed by the processor, cause the processor to:
obtain a data format of data to be processed and preprocess the data to be processed, wherein preprocessing the data to be processed comprises removing extra spaces, punctuation, and character information in the data to be processed;
search for a data category corresponding to the data format of the data to be processed in a first database, wherein the first database is configured to store data categories of different data formats of processed data;
if the data category corresponding to the data format is found, extract feature information of the data to be processed according to a first preset rule, and store the feature information in the first database according to a storage rule of the data category corresponding to the data format of the data to be processed, wherein the data to be processed is text data, the data to be processed is related to statistics of incidence of diseases, comprising disease names, patient ages, patient genders, patient occupations, patient cities of residency, and patient living habits, the text data is simplified, and certain modifiers in the text data are removed, a word vector algorithm is used to process keywords of the text data to obtain feature information of the text data, and when the feature information of the text data has common characteristics, the common characteristics are visually marked according to a preset manner; and
if no data category corresponding to the data format is found, search the data category corresponding to the data format in a second database according to a second preset rule, extract feature information of the data to be processed according to the first preset rule, and store the extracted feature information in the first database according to the storage rule of the data category corresponding to the data format of the data to be processed, wherein the second database stores feature information of a plurality of data categories.

8. The computing device of claim 7, wherein the processor extracts the feature information of the data to be processed according to the first preset rule and stores the feature information in the first database according to the storage rule of the data category corresponding to the data format of the data to be processed by:
obtaining feature information and a storage rule of the data category in the first database;
extracting feature information to be processed that matches the feature information of the data of the data category from the data to be processed; and
processing the feature information to be processed that matches the feature information of the data of the data category according to the storage rule, and storing the processed feature information in the first database according to the data category corresponding to the data format of the processed data.

9. The computing device of claim 8, wherein when the text data is words, the processor extracts the feature information to be processed that matches the feature information of the data category from the data to be processed by:
performing a matching calculation on the words and the feature information of the data of the data category, wherein the matching calculation comprises logical merging and/or AI natural language processing;
extracting feature information of the words according to a result of the matching calculation; and
adjusting a word order of the extracted feature information according to semantics and/or part of speech of the words to be processed.

10. The computing device of claim 7, wherein the processor searches for the data category corresponding to the data format of the data to be processed in the second database according to the second preset rule by:
determining whether the data to be processed corresponds to a data category stored in the second database;
if the data to be processed corresponds to a data category stored in the second database, inputting keywords of the data to be processed into a preset neural network algorithm model to confirm the data category corresponding to the keywords of the data to be processed; and
if the data to be processed does not correspond to a data category stored in the second database, adding a data category corresponding to the data to be processed to the second database.

11. The computing device of claim 7, wherein the processor constructs the second database by:
extracting keywords of a technical field from technical data of any data category;
inputting the keywords into a second data model to extract feature information of the technical field; and
storing the extracted feature information and the corresponding data category in the second database.

12. The computing device of claim 11, wherein the processor constructs the second data model by:
dividing the extracted keywords of the technical field from the technical data of different categories into a training set and a verification set;
training the second data model by the training set, wherein the second data model obtains feature information of the keywords in the training set;
verifying the trained second data model by the verification set, and obtaining an accuracy rate of the trained second data model according to a verification result;
determining whether the accuracy rate of the trained second data model is greater than a preset threshold;
if the accuracy rate is greater than the preset threshold, outputting the trained second data model; and if the accuracy rate is not greater than the preset threshold, retraining the trained second data model.

* * * * *